United States Patent [19]

Cyphelly

[11] 4,176,548
[45] Dec. 4, 1979

[54] HYDROSTATIC TORQUE MEASURING DEVICE FOR ROTATING SHAFTS

[76] Inventor: Ivan J. Cyphelly, Neuhaus, Hinteregg, Switzerland, 8128

[21] Appl. No.: 916,211

[22] Filed: Jun. 16, 1978

[30] Foreign Application Priority Data

Jun. 20, 1977 [CH] Switzerland .......................... 7531/77

[51] Int. Cl.² ............................................. G01L 3/02
[52] U.S. Cl. ................................................ 73/136 D
[58] Field of Search .......................... 73/136 D, 136 R

[56] References Cited

U.S. PATENT DOCUMENTS

| | | | |
|---|---|---|---|
| 2,322,182 | 6/1943 | Walker | 73/136 D |
| 2,398,167 | 4/1946 | Walker | 73/136 D |
| 2,935,869 | 5/1960 | Shipley | 73/136 D |
| 3,057,193 | 10/1962 | Wiggermann | 73/136 D |
| 3,383,911 | 5/1968 | Wiggermann | 73/136 D |

FOREIGN PATENT DOCUMENTS 1178394  1/1970  United Kingdom ................... 73/136 D

*Primary Examiner*—Herbert Goldstein
*Attorney, Agent, or Firm*—Browdy and Neimark

[57] ABSTRACT

An input shaft is provided with a cylinder and an output shaft is provided with a rotary wing piston in the cylinder. The rotary wing piston has two arms and together with two diametrically opposite cylinder cams forms two pairs of pressure chambers. Depending on the direction of torque, a pressure medium is supplied to one of the pairs of pressure chambers by means of two three way valves provided on the cylinder wall. The slits between the frontal surfaces of the cams and the opposing surfaces of the rotary wing piston throttle the outflow of the pressure medium out of the chamber pair. As a result of the automatically adjusting equilibrium between the applied torque and the compressive force in the pressure chamber pair, the pressure of the pressure medium supplied by a pump is a measurement for the magnitude of the transferred torque and can be read on a manometer. The throttle surfaces of the cylinder cams also simultaneously act as stops for the rotary wing piston, so that no angle discontinuity appears during a failure of the pressure medium. As a result of the large throttle surfaces on the cylinder cams and the opposing surfaces of the rotary wing piston, there is high rigidity of the torque transfer.

4 Claims, 2 Drawing Figures

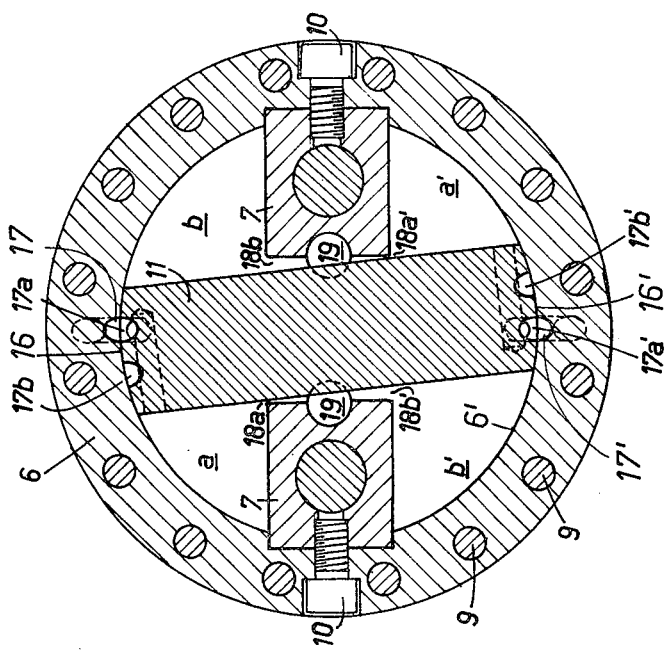
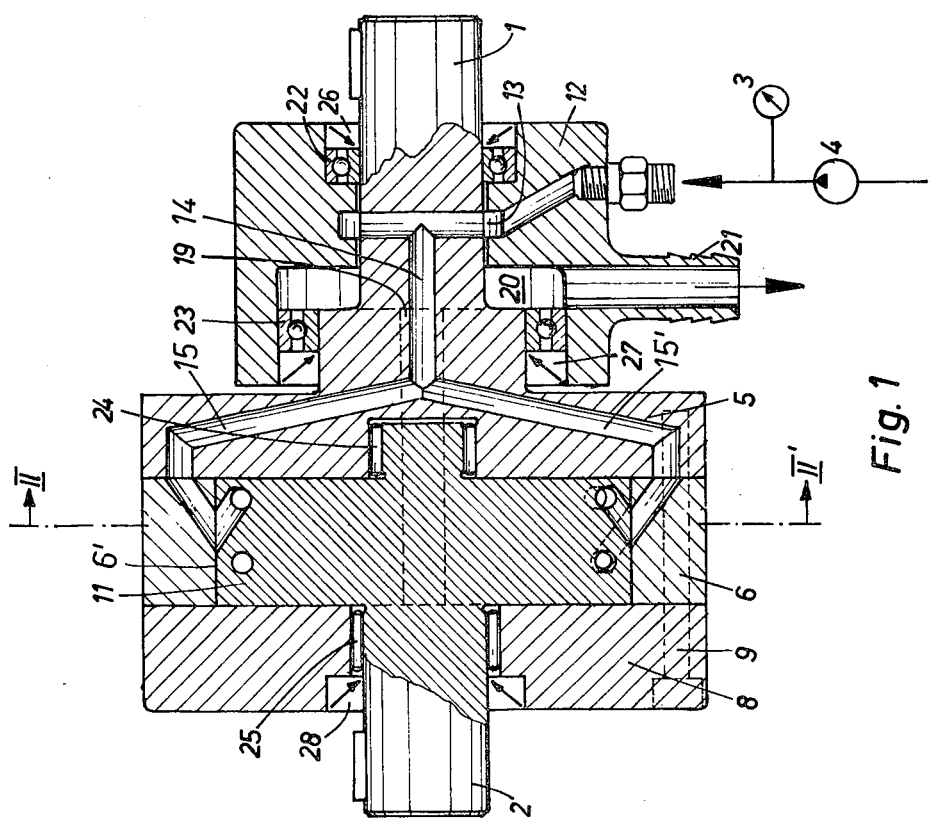

HYDROSTATIC TORQUE MEASURING DEVICE FOR ROTATING SHAFTS

FIELD OF THE INVENTION

This invention relates to a hydrostatic torque measuring device for rotating shafts, with an input shaft and an output shaft, one of which is rigidly connected with a rotary wing piston and the other of which is rigidly connected with a cylinder in which the rotary wing piston is arranged, whereby pressure chambers are formed in the cylinder by the rotary wing piston to which a pressure medium is supplied, and wherein the cylinder is provided with cams to form automatically balancing throttle slits with the rotary wing piston in such a manner that the compressive force of the pressure medium, which is in equilibrium with the exerted torque, forms a measure for the magnitude of the torque.

BACKGROUND OF THE INVENTION

In this type of torque measuring device the automatically balancing throttle locations bring the supplied pressure medium current, for example, especially oil current, to a measuring pressure which is proportional to the exerted torque.

Known hydrostatic torque measuring devices of the above-mentioned type employ a multi-chambered rotary piston, which is moved by the rotation of the input and output shafts and closes off or exposes valve openings in the side wall proportionately to the angle of rotation in such a manner that a compressive force is built up in the corresponding piston chamber, which is in equilibrium with the applied torque.

The achievement of a frictionless rotary piston, however, faces several difficulties, yet must be guaranteed very tight tolerances on two diameters with perfect concentricity. In addition, the localized throttling results in a large elasticity between the drive and output shafts and to an angle discontinuity when there is a failure of the hydraulic measuring fluid; both phenomena can lead to a destruction of the measuring device or the installation.

SUMMARY OF THE INVENTION

The present invention has the objective of creating an hydrostatic torque measuring device of the above-mentioned type, which requires the conformance with only a single diameter tolerance and still has great rigidity without an angle discontinuity should the measuring fluid or pressure medium fail.

According to the invention the hydrostatic torque messuring device is characterized in that the throttling surfaces of the cams of the cylinder serve simultaneously as stops for the rotary wing piston in both directions of rotation and form inner boundary surfaces of the pressure chambers in the cylinder.

In this torque measuring device the side walls and cylinder walls exert only a rough valve function in coordinating the pressure chambers with the torque direction.

BRIEF DESCRIPTION OF THE DRAWINGS

An exemplary embodiment of the object of the invention is described below with the aid of the drawings. Shown are:

FIG. 1, which is a section through the axis of the torque measuring device.

FIG. 2, which is a section taken on the line II—II' of FIG. 1.

DESCRIPTION OF A PREFERRED EMBODIMENT

A torque is transferred from an input shaft 1 of the torque measuring device to an output shaft 2, the value of which can be read, on the basis of the following explanation, on a manometer 3, which measures the pressure of a flow of pressure medium such as an oil flow delivered into the device by a pump 4.

The input shaft 1 is provided with a flange 5, which forms one of the side walls of a cylinder, which also includes a cylinder casing 6 and a cover 8. These cylinder components are held together by screws 9. In the interior of the cylinder two cams 7 are arranged diametrically opposite one another in the cylinder wall 6' and held in place by screws 10. A rotary piston 11 with a two-armed wing is arranged in the cylinder 5,6,8, which is rigidly connected with the output shaft 2 or is formed in one piece therewith. The rotary wing piston 11, the cams 7, the cylinder wall 6, the flange 5 and the cover 8 accordingly form two pairs of pressure chambers a,a' and b,b' in the interior of the cylinder.

The pressure medium flow which serves as a hydraulic measuring flow, travels from the pump 4 through a passage 13 in a longitudinal bore 14 of shaft 1 which is arranged between a housing 12 and the input shaft 1. The longitudinal bore 14 branches into two bores 15 and 15' in the flange 5, each of which bores leads to a three way coordinating valve 16 or 16'. The three way coordinating valves 16,16' each includes an opening 17 or 17' of the bore 15 or 15' in the cylinder wall as well as two openings 17a and 17b or 17a' and 17b' which are displaced in the circumferential direction and are located in the frontal surfaces of the two arms of the rotary wing piston 11. Each opening 17a, 17b, 17a', 17b' of the rotary wing piston 11 is associated with a cross bore which opens into one of the pressure chambers a,a', b,b'. In the illustrated exemplary embodiment, the opening 17a is accordingly shown in connection with the pressure chamber a, the opening 17b with the pressure chamber b, the opening 17a' with the pressure chamber a' and the opening 17b' with the pressure chamber b'. Depending on the relative position of the rotary wing piston to the cylinder 5,6,8, which position is limited in its rotational direction by the cams 7 which act as stops, the pressure medium is supplied from the pump 4 through the passage 13, the bores 14, 15, 15' and the coordinating valves 16,16' either to the pressure chamber pair a,a' or to the pressure chamber pair b,b'.

As can be seen from FIG. 2, constrictions or throttle slits 18a, 18b,18a', and 18b' are found between the frontal surfaces of the cams 7 and the opposite surfaces of the rotary wing pistons, which slits form the pressure medium outlets of the chambers a,b,a', b' into return bores 19. The return bores 19 open into a collecting chamber 20, which lies between the housing 12 and the input shaft 1. An exterior nipple 21 is in communication with the collecting chamber 20, to which a line can be connected to lead the pressure medium into a supply tank which is not shown.

Two ball bearing assemblies 22 and 23 are arranged in the rigid housing 12 to rotatably mount the rotating input shaft 1 with respect to the cylinder 5,6,8. The output shaft 2 with the rotary wing piston 11 is rotatably mounted in the cover 8 and in the flange 5 of the cylinder by means of needle bearings 24 and 25. Lip type packings 26, 27 and 28 are provided for sealing. It is advantageous to utilize a device such as that described in the Swiss Pat. Nos. 522,153 and 526,061, in the German Pat. No. 2,043,844, in the French Pat. No. 2,065,362 and in the USA Pat. No. 3,685,842, as a high pressure feed line for the pressure medium between the housing 12 and the input shaft 1.

According to the torque transferred from the input shaft 1 to the output shaft 2, the pressure medium is throttled at the chamber outlets in the throttle slits 18a, 18a' or 18b', 18b' and led back into the supply tank. A pressure is thus formed in the chamber which extends from the pair a,a' or b,b' of pressure chambers acted upon by the pressure medium to the pump 4, which pressure is a measure of the torque transferred from the torque measuring device and can be read on the manometer 3.

Because each throttle location 18a, 18a', 18b, 18b' is distributed over the entire wing width of the rotary wing piston 11, even a small shift of the rotary piston wing 11 relative to the cylinder 5,6,8 is sufficient to effect a large pressure change; in other words the rigidity of the system is very high. The precise positioning of the throttle surfaces at the edges of the cylinder cams 7 with regard to the opposite surfaces on the rotary wing piston 11 results from the stop function thereof: If the torque measuring device is placed under torque without any pressure medium present, the hard surfaces of the rotary wing piston 11 press against the soft edges of the cylinder cams 7 in such a manner that a perfect alignment of the throttling location results.

It will be obvious to those skilled in the art that various changes may be made without departing from the scope of the invention and the invention is not to be considered limited to what is shown in the drawings and described in the specification.

What is claimed is:

1. In a hydrostatic torque measuring device for rotating shafts, the device comprising an input shaft and an output shaft, one of which is rigidly connected with a rotary wing piston and the other of which is rigidly connected with a cylinder having a wall in which the rotary wing piston is arranged, pressure chambers being formed in the cylinder by the rotary wing piston, to which chambers a pressure medium is supplied and the cylinder being provided with a plurality of cams to form automatically balancing throttle slits with the rotary wing piston in such a manner that the compressive force of the pressure medium, which is in equilibrium with the exerted torque, forms a measure for the magnitude of the torque, the improvement wherein said rotary wing piston is formed with a plurality of radially extending arms, and wherein said plurality of cams project from said cylinder wall with said wing piston arms extending between a frontal surface of said cams in such a manner that said arms of said rotary wing piston, said cams and said cylinder wall define a plurality of pressure chambers and an equal plurality of exhausted chambers, throttling surfaces at one of two edges of said frontal surface of each said cam forming an inner boundary surface of each said pressure chamber, said throttling surfaces forming with opposite surfaces of said arms of said rotary wing piston throttling slits for said pressure chambers in each direction of rotation of said rotary wing piston, and acting as stops therefor, and a return passage for the pressure medium being provided in each said cam and having an opening at said frontal surface thereof.

2. An improved torque measuring device according to claim 1, wherein said rotary wing piston is formed with two arms, and wherein said plurality of cams is constituted by two cams which project radially from said cylinder wall and are arranged diametrically opposite one another in such a manner that said rotary wing piston, said two cams and said cylinder wall define two pairs of said pressure chambers.

3. An improved torque measuring device according to claim 2, including at least one three way coordinating valve arranged between said rotary wing piston and said cylinder which respectively supplies one of said two pairs of pressure chambers with pressure medium and which is switched from one pair of said pressure chambers to the other when there is a switch in the direction of torque by relative movement between said rotary wing piston and said cylinder.

4. An improved torque measuring device according to claim 3, wherein a three way coordinating valve is arranged in each of the common surface areas of said cylinder wall and a frontal surface of each arm of said rotary wing piston and includes an opening in said cylinder wall which is connected with a supply bore for pressure medium, as well as two openings in the frontal surface of the respective associated arm of said rotary wing piston, each of which opens into a given chamber of one or the other of said two pairs of the pressure chambers by an associated bore, and each of which registers in one of two relative rotational positions of said rotary wing piston which a respective associated said opening in said cylinder wall.

* * * * *